No. 780,659. PATENTED JAN. 24, 1905.
A. A. & E. H. HOYT.
ANIMAL TRAP.
APPLICATION FILED MAY 9, 1904.
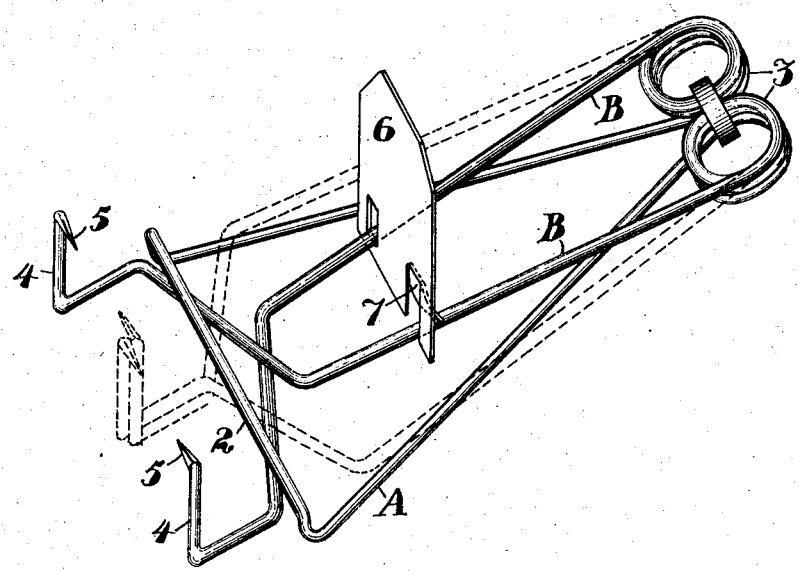
Witnesses:-
F. C. Fliedner
Inventors
Asa A. Hoyt
Ernest H. Hoyt
by Geo. H. Strong, atty No. 780,659.

Patented January 24, 1905.

UNITED STATES PATENT OFFICE.

ASA A. HOYT AND ERNEST H. HOYT, OF WATSONVILLE, CALIFORNIA.

ANIMAL-TRAP.

SPECIFICATION forming part of Letters Patent No. 780,659, dated January 24, 1905.

Application filed May 9, 1904. Serial No. 207,020.

*To all whom it may concern:*

Be it known that we, ASA A. HOYT and ERNEST H. HOYT, citizens of the United States, residing at Watsonville, in the county of Santa Cruz and State of California, have invented new and useful Improvements in Animal-Traps, of which the following is a specification.

Our invention relates to improvements in traps which are especially designed to catch gophers and the like, and pertains particularly to that type of trap made from a single piece of spring-wire and having opposed spring-operated jaw-carrying members held apart when set by suitable trigger mechanism.

Its object is to provide a trap of this character having means for adjusting it to large and small gophers and with suitable guide and supporting means for the spring-arms, whereby greater stability is afforded to the trap and greater accuracy obtained in its operation.

A difficulty with many of the gopher-traps already in existence is that the jaw-arms are flimsy and when closing on an object are liable to twist and throw the holding means out of line and allow the animal to escape.

The invention consists of the parts and the construction and combination of parts, as hereinafter more fully described and claimed, having reference to the accompanying drawing, in which the figure is a perspective view of our invention.

A represents the base or frame of our trap made from a single piece of heavy spring-wire by bending it to form two rearwardly-convergent side portions, with the front ends of these side portions, bent upwardly and connected by an integral cross-bar portion 2, lying above and in a plane parallel with said side portions. The rear ends of the side portions terminate in coil-springs 3, from which extend the spring-arms B, lying normally outside of, above, and approximately parallel with the side portions of base A. These arms immediately adjacent to cross-bar 2 are bent inwardly to cross each other and then extend forward parallel with each other beneath bar 2 and terminate in two vertical opposed jaws 4 with impaling-points 5, the jaws, points, arms, springs, and base all being, as here shown, made from a single piece of spring-wire.

The trigger 6 is loosely pivoted on one of the arms B and is notched on its under side to enable it to engage the opposite arm in the act of setting the trap. The notch in the trigger is formed by stamping out a clip 7, bending this at an angle to the plate, and adapting it as a fulcrum to bear on the engaged arm to cause the release of the seated trigger when the latter is pressed backward from the front.

The trigger can be set at any point in the length of the arms. If set well forward, the trap is suited to catch small gophers. If set farther back, the jaws are opened wider and are adapted for large gophers.

The cross-bar 2 serves as a top guide, and the sides of the base A coöperate as bottom guides for the spring-arms to maintain them in approximately the same horizontal plane. Without some such guide means the tendency of the arms is to twist when closed on an object and by throwing the impaling-points far out of line allow the object, if a robust and active gopher, to escape.

Having thus described our invention, what we claim, and desire to secure by Letters Patent, is—

1. A trap composed of a single piece of spring-wire bent to form a base portion and two opposed spring-pressed jaw members, said base arranged to provide guide means to maintain said arms in approximately the same plane and prevent their twisting when sprung, and trigger mechanism for setting the trap.

2. A trap having opposed spring-arms, with opposed jaw members, upper and lower guides between which said arms are movable to maintain the spring-arms in approximately the same plane and prevent their twisting when sprung and trigger mechanism operatably associated with the spring-arms.

3. A trap composed of a base portion and opposed spring-arms formed from a single piece of spring-wire, said base portion formed to provide upper and lower means for the spring-arms to maintain them always in substantially the same plane, and trigger mechanism operatably associated with the arms.

4. A trap made from a single piece of spring-wire, comprising a base portion and integral jaw-provided spring-arms, said base portion having side members and a front connecting member, said arms arranged to operate on one side of said side members and on the other side of said front connecting member, and trigger mechanism associated with the arms.

5. A trap comprising a base portion, and spring-jaw-provided arms made from a single piece of spring-wire, said base portion having a front cross-piece and two side pieces, said front piece being raised above and parallel to the side pieces and extending over said arms, and trigger mechanism associated with the arms.

6. A trap comprising a base portion and integral jaw-provided spring-arms, said base portion having two side pieces and a connecting front elevated piece, said arms normally extending above and beyond said side pieces and projecting beneath said front piece, and trigger mechanism associated with the arms.

7. A trap having two opposed jaw-provided, normally separated spring-arms, guiding means between which said arms are movable in approximately the same plane to prevent their twisting when sprung, and a trigger-plate loosely pivoted on one of said arms and having means of engagement with the other arm, said plate being freely movable longitudinally of the arms to open the jaws more or less.

In testimony whereof we have hereunto set our hands in presence of two subscribing witnesses.

ASA A. HOYT.
ERNEST H. HOYT.

Witnesses:
J. J. MOREY,
EDW. KELLY.